United States Patent

Wagner et al.

[11] 3,938,029
[45] Feb. 10, 1976

[54] LOW NOISE DC POWER SUPPLY SYSTEM FOR ELECTRONICS ON A ROTATING ASSEMBLY

[75] Inventors: Peter B. Wagner; James W. Telford, both of Reno, Nev.

[73] Assignee: The United States of America as represented by the Secretary of the Navy, Washington, D.C.

[22] Filed: July 5, 1974

[21] Appl. No.: 486,036

[52] U.S. Cl. .................................. 323/2; 307/154
[51] Int. Cl.² .......................................... H02J 1/00
[58] Field of Search ........... 307/149, 150, 151, 154; 310/72; 317/262 R; 321/2, 10; 323/1, 2, 93, 100

[56] References Cited
UNITED STATES PATENTS

| | | | |
|---|---|---|---|
| 2,008,377 | 7/1935 | Whitaker | 310/72 X |
| 2,015,667 | 10/1935 | Fleming et al. | 310/72 |
| 3,665,291 | 5/1972 | Weischedel et al. | 321/2 X |
| 3,736,491 | 5/1973 | Kuster | 321/2 X |

Primary Examiner—A. D. Pellinen
Attorney, Agent, or Firm—R. S. Sciascia; Charles D. B. Curry

[57] ABSTRACT

A low noise D. C. power supply system that is particularly suited for supplying D. C. power from a stationary source to electronics equipment mounted on a rotating assembly. Brush and slip ring assemblies are used to transfer the D. C. power to the rotating assembly and brush noise is minimized by having noninductive impedances on both sides of the brush and slip ring assemblies. Floating circuits are employed to transfer the D. C. power from the stationary assembly to the rotating assembly with the return reference ground being through the brush and slip ring assemblies to the stationary assembly. Higher than usual voltages are supplied to a capacitor mounted on the rotating assembly to charge the capacitor providing reserve energy storage, providing a voltage margin for further regulation and thus minimizing the effect of brush noise.

6 Claims, 2 Drawing Figures

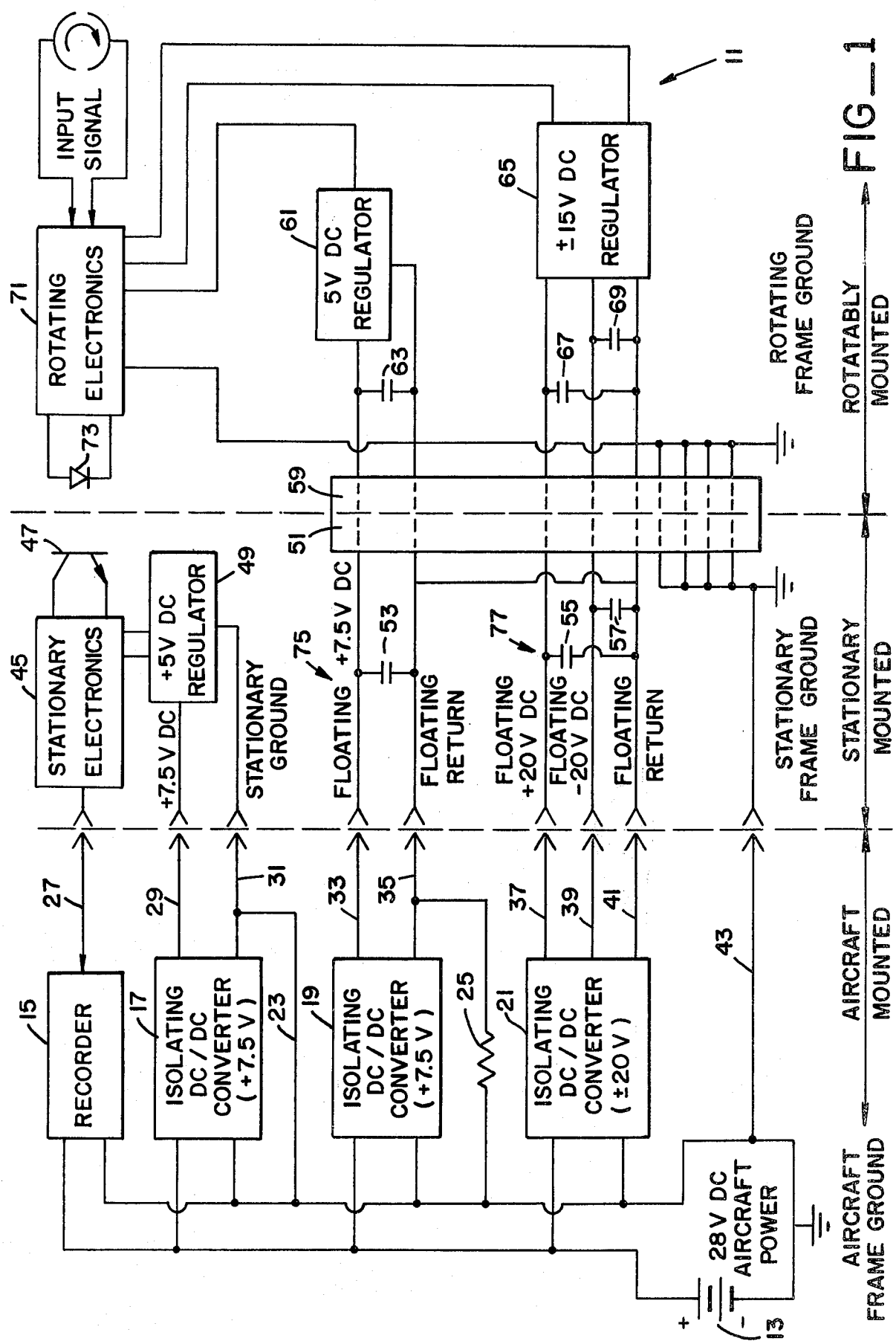
FIG_1

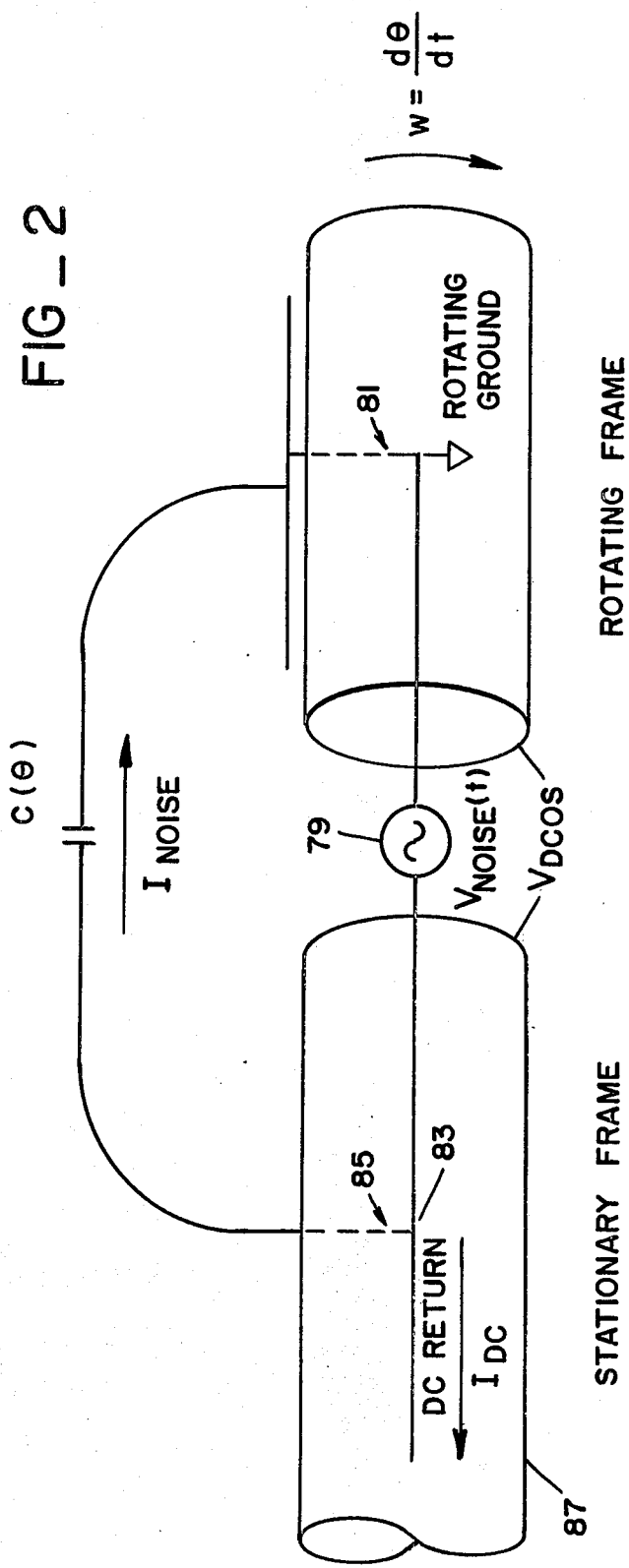

3,938,029

LOW NOISE DC POWER SUPPLY SYSTEM FOR ELECTRONICS ON A ROTATING ASSEMBLY

BACKGROUND OF THE INVENTION

1. Field of the Invention

The present invention relates to a power supply system and more particularly to a low noise floating D. C. power supply system.

2. Description of the Prior ARt

Low-noise D. C. power is normally required for satisfactory operation of sensitive electronic equipment. When the electronic equipment is mounted on a rotating shaft the supply of the D. C. power is normally through brushes to slip rings mounted on the shaft or by mounting a D. C. battery on the rotating shaft itself. Brushes in contact with slip rings are invariably a source of noise due to varying resistance during rotation. Batteries are normally heavy, bulky and must be periodically replaced or recharged. The floating D. C. power supply system of the present invention overcomes these difficulties by providing a D. C. power supply system for electronics mounted on a rotating assembly that has low noise characteristics and is of small size and weight.

SUMMARY OF THE INVENTION

Briefly, the present invention comprises a low noise D. D. power supply system that is particularly suited for supplying D. C. power from a stationary source to electronics equipment mounted on a rotating assembly. Brush and slip ring assemblies are used to transfer the D. C. power to the rotating assembly and brush noise is minimized by having non-inductive impedances on both sides of the brush and slip ring assemblies. Floating circuits are employed to transfer the D. C. power from the stationary assembly to the rotating assembly with the return reference ground being through the brush and slip ring assemblies to the stationary assembly. Higher than usual voltages are supplied to a capacitor mounted on the rotating assembly to charge the capacitor providing reserve energy storage, providing a voltage margin for further regulation and thus minimizing the effect of brush noise.

STATEMENT OF THE OBJECTS OF THE INVENTION

An object of the present invention is to provide low noise D. C. power from a stationary member to a rotating member;

Another object of the present invention is to provide a floating ground D. C. power supply system;

Still another object of the present invention is to provide a D. C. power system that employs capacitive storage;

A further object of the present invention is to provide a D. C. power system that minimizes the noise introduced by brushes and slip rings; and A still further object of the present invention is to provide a floating D. C. power supply system that employs a low current flow path that provides a reference to ground.

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a schematic diagram of the low noise D. C. power supply system of the present invention; and FIG. 2 is a diagram illustrating an equivalent circuit to explain the operation of the floating circuits of the low noise D.C. power supply system of the present invention.

DESCRIPTION OF THE PREFERRED EMBODIMENT

In FIG. 1 is illustrated the low noise D. C. power supply system 11 of the present invention for supplying power to electronics equipment mounted on a rotating assembly. FIG. 1 is divided into three parts: (1) the components mounted on an aircraft, for example; (2) the stationary mounted components on an electric field measuring device, for example; (3) the rotatably mounted components on an electric field measuring device, for example. This power supply of the present invention has been found to be particularly useful for supplying high quality low noise D. C. power to an electric field measuring device that is mounted on the nose boom of a flying aircraft. Since atmospheric electric fields can be as low as several volts per meter it is necessary to supply exceedingly low noise D. C. power to the rotating electronics of the electric field measuring device which senses and processes the low level signals received from these atmospheric fields.

Mounted on the aircraft are battery 13, having a 28 VDC output, for example, recorder 15, isolating D. C. to D. C. converter 17 having a +7.5 VDC output, for example, isolating D. C. to D. C. converter 19 having a +7.5 VDC output, for example, and isolating D. C. to D. C. converter 21 having a ± 20 VDC output, for example. The aircraft mounted battery 13 has one side, the positive side, for example, connected to the respective inputs of recorder 15 and D. C. to D. C. converters 17, 19 and 21. The other side of battery 13, the negative side, for example, is connected to ground (the aircraft frame, for example) and to the respective other inputs of recorder 15, and to D. C. to D. C. converters 17, 19 and 21. The ground output of D. C. to D. C. converter 17 is directly connected to aircraft ground by cable 23 and the ground output of D. C. to D. C. converter 19 is connected through resistor 25 to aircraft ground. Resistor 25 is selected to have a high value, for example 10 K ohms, for reasons to be hereinafter explained.

As illustrated in FIG. 1, the input of recorder 15, the outputs of isolating D. C. to D. C. converters 17, 19 and 21, and aircraft ground are respectively connected through a plurality of lead wires 27 through 43 and cable connectors to the stationary components of an electric field measuring device, for example. The input of recorder 15 is connected by lead wire 27 to the output of stationary electronics 45. The input to stationary electronics 45 is connected to the output of a stationary optical receiver 47 that may be an infrared phototransistor, for example. The outputs of isolating D. C. to D. C. converter 17 are connected to the inputs of +5VDC regulator 49, for example, that supplies regulated D. C. power to stationary electronics 45. The outputs of isolating D. C. to D. C. converters 19 and 21, through lead wires 33, 35, 37, 39 and 41 are connected to the respective brushes, schematically illustrated by dotted lines, of brush assembly 51. The aircraft ground, through lead wire 43, is connected to the stationary frame ground and to a plurality of brushes, schematically illustrated by dotted lines, of brush assembly 51.

Connected across lead wires 33 and 35 of the +7.5VDC floating power output of isolating D. C. to D. C. converter 19 is capacitor 53. Connected across lead wires 37 and 41 of the +20VDC floating power output of isolating D. C. to D. C. converter 21 is capacitor 55. Connected across lead lines 39 and 41 of the −20VDC floating power output of isolating D. C. to D. C. converter 21 is capacitor 57.

The slip rings, schematically illustrated by dotted lines, of slip ring assembly 59 connect the output of isolating D. C. to D. C. converter 19 to the inputs of 5VDC, for example, rotating regulator 61. A capacitor 63 is connected across the input and ground of regulator 61. The slip rings, schematically illustrated by dotted lines, of slip ring assembly 59 connect the outputs of isolating D. C. to D. C. converter 21 to the inputs of ± 15VDC, for example, rotating regulator 65. Capacitor 67 is connected across the +20VDC input and ground of regulator 65 and capacitor 69 is connected across the −20VDC input and ground of regulator 65. The outputs of rotating regulators 61 and 65 are connected to the power inputs of rotating electronics 71. The output of rotating electronics 71 is connected to the input of rotating optical transmitter 73 which may be an infrared light emitting diode, for example. In response to an input signal, indicating an electric field, for example, the light from rotating optical transmitter 73 is transmitted across an air gap to the input of stationary optical receiver 47 where it is processed by stationary electronics 45 and then applied to the input of aircraft mounted recorder 15.

It should be particularly noted that the grounds of rotating electronics 71 and rotating regulators 61 and 65 are interconnected and are connected to the rotating frame ground and to a plurality of slip rings, schematically illustrated by dotted lines of slip ring assembly 59. These slip rings are operably connected to the respective brushes of brush assembly 51 that are connected to the stationary frame ground and to the aircraft ground.

The operation of the power supply of FIG. 1 is as follows. At the outset it should be noted that a slip ring and associated brush have a variable resistance contact and current flowing through the contact will therefore generate a variable voltage drop which may be viewed as undesirable noise. To reduce the noise across the brush and associated slip ring it is desirable that the impedance in both directions be non-inductive. For this reason, and to provide energy storage, large capacitors are employed on each side and physically located near to the brush and associated slip ring. In FIG. 1 this is illustrated with reference to isolating D. C. to D. C. converter 19 by the use of capacitors 53 and 63. This is also illustrated with reference to isolating D. C. to D. C. converter 21 by the use of capacitor pair 55 and 67 and capacitor pair 57 and 69. Resistor 25 is provided to provide a high impedance current discharge path to prevent converters 19 and 21 from applying a leakage potential to floating circuits 75 and 77 when the rotatable electronics are not in operation or are removed.

It should be particularly noted that capacitors 63, 67 and 69 are selected to have large values of capacitance, such as 10 or more microfarads, depending on the current requirement. Not only does this provide a capacitive impedance but it also provides a current source which will supply current to the rotating regulators 61 and 65 when the resistance of the brush and associated slip ring increases and thereby minimizes the effect of brush noise.

It should be particularly noted that circuits 75 and 77 are floating. That is, without the rotating member these circuits would be floating in that there is no connection, except through resistor 25, which has a high value, to any other circuit or D. C. reference such as aircraft ground. It should be particularly noted however, that these floating circuits 75 and 77 have an aircraft ground reference, through slip ring assembly 59 and brush assembly 51 and lead line 43, when the rotatably mounted circuits are connected in place as shown in FIG. 1.

In FIG. 2 is illustrated an equivalent circuit illustrating the reason for coupling the ground of circuits 75 and 77 through the brush and slip assemblies rather than directly connecting to aircraft ground.

In FIG. 2 the noise signal generated by current through brush contacts in the D. C. returns is illustrated by generator 79. Capacitive coupling between one capacitive plate on the rotating member and the stationary frame is equal to $C(\theta)$, a function of the angular position of the rotating member. The capacitive plate is held at ground by associated electronics in the rotating frame. This is represented by the dotted lines connection 81. Should there also be a connection represented by the dotted lines 85 between the D. C. return 83 and the stationary frame 85 the completed circuit made by this connection would induce a noise current $V'_{noise}/C(\theta)$ in the capacitive plates. This would, at best, reduce the signal-to-noise ratio at the input to the rotating electronics and, at worst (in the case of high gain configuration), saturate the electronics and eliminate their further function. For this reason the entire supply circuit of FIG. 1 must have no low-impedance connection to the stationary frame.

Note also that since the capacitance in FIG. 2 is a function of angular position, $\theta$, any D. C. voltage offset $V_{DCOS}$ will also appear as a signal on the capacitive plate on the rotating frame. It is important to minimize this effect first by carefully connecting the rotating and stationary frames electrically through multiple parallel brush and associated slip ring contacts as shown in FIG. 1; second, by eliminating sources of current flowing through these contacts; third, by constructing the capacitive plate and stationary frame exerior of the same material to eliminate a contact potential difference between the capacitive plate and stationary body and last, by reducing the angular dependence of $C(\theta)$ to a minimum.

What is claimed is:

1. A low noise D. C. power supply comprising:
   a. a stationary assembly and a rotatable assembly;
   b. a brush assembly operably connected to said stationary assembly and a slip ring assembly operably connected to said rotatable assembly;
   c. said brush assembly including at least first, second and third brushes and said slip ring assembly including at least first, second and third slip rings, said first, second and third brushes being respectively operably connected to said first, said second and third slip rings;
   d. a stationary D. C. power source having one side connected to a stationary ground, to said third brush and to one input of a stationary D. C. to D. C. converter and the other side connected to the other input of said D. C. to D. C. counter;

e. a first ouput of said stationary D. C. to D. C. converter being connected to said first brush and a second output being connected to said second brush;

f. said first and second slip rings being connected to a D. C. regulator mounted on said rotatable assembly;

g. the output of said D. C. regulator being connected to one input of an electronic assembly mounted on said rotatable assembly; and h. the ground of said electronics assembly and said second slip ring being connected to said third slip ring.

2. The device of claim 1 including:

a. a first capacitor connected between said first and second brushes.

3. The device of claim 2 including:

a. a second capacitor connected between said first and second slip rings.

4. The device of claim 3 wherein:

a. said second capacitor is greater than about 10 microfarads.

5. The device of claim 4 including:

a. a resistor operably connected between said second output of said stationary D. C. to D. C. converter and said one side of said stationary D. C. power source.

6. The device of claim 5 wherein:

a. the D. C. voltage supplied to said second capacitor is substantially greater than required to provide the required power supplied by said rotatable D. C. regulator.

* * * * *